United States Patent Office 3,704,306
Patented Nov. 28, 1972

3,704,306
ADAMANTANE-1,3-DICARBOXYLIC ACID ESTERS
Carl Peter Krimmel, Wauconda, Ill., assignor to G. D.
Searle & Co., Chicago, Ill.
No Drawing. Continuation-in-part of application Ser. No. 631,181, Apr. 17, 1967. This application Jan. 26, 1970, Ser. No. 5,989
Int. Cl. C07d 51/70
U.S. Cl. 260—268 PA    8 Claims

ABSTRACT OF THE DISCLOSURE

Dialkylaminoalkyl and related esters of adamantane-1,3-dicarboxylic acid and adamantane-1,3-diacetic acid are described. They are useful as antifungal and anti-viral agents. The compounds are prepared by the reaction of the approproate dicarboxylic acid with a dialkylaminoalkyl halide or they can be prepared by the reaction of the appropriate dicarboxylic acid halide with a dialkylaminoalkanol or similar compound.

---

The present application is a continuation-in-part of application Ser. No. 631,181, filed Apr. 17, 1967, and now abandoned.

The present invention relates to a group of aminoalkyl esters of adamantane - 1,3 - dicarboxylic acid and adamantane-1,3-diacetic acid. In particular, it relates to a group of compounds having the following general formula

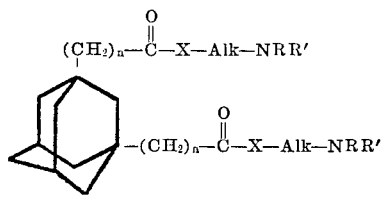

wherein $n$ is a whole number between 0 and 1 inclusive; X is selected from the group consisting of O and S; Alk is a lower alkylene radical separating the atoms attached thereto by at least two carbon atoms; and —NRR' is selected from the group consisting of di(lower alkyl) amino and cyclic amino. Examples of cyclic amino radicals are 1-pyrrolidinyl, piperidino, morpholino, and 4-methyl-1-piperazinyl.

The lower alkylene radicals referred to above contain up to 6 carbon atoms and can be exemplified by radicals such as ethylene, propylene, trimethylene, and tetramethylene. The lower alkyl radicals referred to above likewise contain up to 6 carbon atoms and can be exemplified by radicals such as methyl, ethyl, propyl, isopropyl, and butyl.

The organic bases of this invention form pharmaceutically acceptable salts with a variety of inorganic and strong organic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, asorbic, and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, methyl benzenesulfonate, ethyl toluenesulfonate, ethylene chlorohydrin, propylene chlorohydrin, allyl bromide, methallyl bromide, and crotyl bromide.

To prepare the compounds of the present invention, an adamantane-1,3-dicarbonyl halide or an adamantane-1,3-diacetyl halide, preferably the chloride, is reacted with the appropriate aminoalkanol or amino-alkanethiol. Another synthetic method, which is useful particularly for the esters described herein, involves the reaction of adamantane - 1,3 - dicarboxylic acid or adamantane-1,3-diacetic acid with an appropriate dialkylaminoalkyl halide in a solvent such as 2-propanol.

The compounds of the present invention are useful because of their anti-biotic activity against a number of organisms. Thus, they inhibit the growth of fungi such as *Trichophyton mentagrophytes* and *Candida albicans* and algae such as *Chlorella vulgaris*. The present compounds can thus be combined with various known excipients and adjuvants in the form of dusts, solutions, suspensions, ointments and sprays to provide compositions useful for disinfecting purposes.

The present compounds are further useful as anti-viral agents as demonstrated by the fact that they inhibit the growth of influenza virus type A (strain 575). This is demonstrated by the following test procedure. Cell cultures of primary rhesus monkey kidney maintained in 25 cc. plastic flasks and each containing test compound at concentrations of 625, 125, 25, 5 or 1 microgram per milliliter are prepared in pairs. These flasks, and an identical pair of flasks containing no test compound, are each innoculated with a dose of influenza virus type A (strain 575) previously shown to produce maximum hemadsorption and minimum cytopathogenic effects after a 24 hour incubation. Where the cultures contain test compound, the virus is added one hour after addition of the compound to the culture. After 24 hours incubation of the cultures, supernatant fluids are removed and 3.0 ml. of a 0.4% suspension of guinea pig erythrocytes are added to each flask. The flasks are then incubated at 4° C. in a horizontal position for 30 minutes. The flasks are rocked every 10 minutes during the incubation period. After this incubation, the red cell suspension is decanted from each flask, the flasks are washed twice with 3.0 ml. of phosphate buffer solution (pH 7.4) to remove unadsorbed red cells, and 3.0 ml. of distilled water is then added to lyse the adsorbed cells. The flasks are then further incubated at 37° C. for 30 minutes in a horizontal position and the flasks are rocked every 10 minutes. After this incubation, the fluid contents of the pairs of flasks are combined to form an assay unit and are placed at room temperature for 15–30 minutes to allow settling of cellular debris. A pair of control flasks identical with the above, except for the absence of test compound and virus inoculation, are run concurrently. The resulting hemoglobin solutions from each assay unit are then read for optical density in a Beckman spectrophotometer at about 415 millimicrons. A test compound is considered active if, at one of the tested levels, it reduces the optical density reading by at least 50% relative to the virus control. When tested by the above procedure, bis-3-diethylaminopropyl adamantane-1,3- diacetate (as the dicitrate hemihydrate), bis-6-dimethylaminohexyl adamantane-1,3-dicarboxylate (as the dicitrate hemihydrate), and bis-3-(4-methyl-1-piperazinyl)propyl adamantane-1,3-diacetate were each found to inhibit the growth of the virus at a concentration of 25 micrograms/ml. or less.

The present compounds have also been found to possess anti-bradykinin activity.

The following examples are presented to further illustrate the present invention; they should not be construed as limiting it in spirit or in scope. In these examples, quantities by weight are indicated in grams, quantities by volume are indicated in milliliters, and temperatures are indicated in degrees centrigrade (° C.).

EXAMPLE 1

To a stirred refluxing solution of 4.0 grams of adamantane-1,3-dicarboxylic acid in 70 ml. of anhydrous 2-propanol, there is added 6.0 grams of 3-diethylaminopropyl chloride. The resultant mixture is refluxed for 4 hours and then distilled under reduced pressure to remove the 2-propanol. The resultant residue is then dissolved in distilled water, treated with charcoal, and filtered, and the filtrate is made alkaline with 10% sodium hydroxide solution. The alkaline solution is then extracted with anhydrous ethyl ether and the ether extract is dried over anhydrous sodium sulfate. Distillation under reduced pressure first removes the ether and is then continued to give bis-3-diethylaminopropyl adamantane-1,3-dicarboxylate as a pale yellow liquid boiling at about 216–226° C. at 0.6 mm. pressure. This compound has the following formula

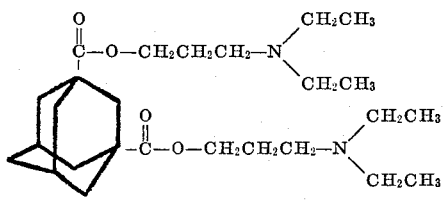

EXAMPLE 2

To a solution of 1.8 grams of bis-3-diethylaminopropyl adamantane-1,3-dicarboxylate in 50 ml. of anhydrous acetone there is added 2 ml. of a 2-propanol solution containing 0.5 gram of hydrogen chloride. The resultant mixture is then diluted with anhydrous ethyl ether until it appears that no additional precipitate forms. The resultant white precipitate, which is hydrogroscopic, is filtered and immediately transferred to a flask containing acetone. The acetone suspension is stirred and refluxed and finally filtered. The solid is then dried under reduced pressure to give bis-3-diethylaminopropyl adamantane-1,3-dicarboxylate dihydrochloride melting at about 150–155° C. The addition of 5 mg. of this compound to an agar plate inoculated with *Candida albicans* inhibits the growth of this organism.

EXAMPLE 3

A solution of 1.0 gram of bis-3-diethylaminopropyl adamantane-1,3-dicarboxylate, 1.9 grams of ethyl bromide, and 10 ml. of 2-butanone is allowed to stand at room temperature in a closed flask. A white crystalline precipitate forms. This is separated by filtration, washed with 2-butanone, and then dried under reduced pressure to give bis-3-diethylaminopropyl adamantane-1,3-dicarboxylate bis-ethobromide melting at about 187–207° C.

EXAMPLE 4

The procedure of Example 1 is repeated using 2.2 grams of adamantane-1,3-dicarboxylic acid, 60 ml. of anhydrous 2-propanol, and 3.0 grams of 2-diethylaminoethyl chloride. The product is collected as a pale yellow liquid boiling at about 228–236° C. at 2.5 mm. pressure. It is bis-2-diethylaminoethyl adamantane-1,3-dicarboxylate.

To a solution of 0.7 gram of bis-2-diethylaminoethyl adamantane-1,3-dicarboxylate in 250 ml. of anhydrous ethyl ether there is added 1.0 ml. of a 2-propanol solution containing 0.23 gram of hydrogen chloride. A gum forms; it is separated and washed by the addition and decantation of anhydrous ethyl ether. The material is then allowed to stand to give a white solid melting at about 162–168° C. This is bis-2-diethylaminoethyl adamantane-1,3-dicarboxylate dihydrochloride.

EXAMPLE 5

2-dimethylaminoethyl chloride, 1-(2-chloroethyl)-piperidine, 1-(2-chloroethyl)pyrrolidine, 4 - (2 - chloroethyl)-morpholine, and 1-(2-chloroethyl) - 4 - methylpiperazine are each reacted wtih adamantane-1,3-dicarboxylic acid according to the procedure described in Example 1 to give, respectively, bis-2-dimethylaminoethyl adamantane-1,3-dicarboxylate, bis - 2 -piperidinoethyl adamantane-1,3-dicarboxylate, bis-2 - (1 - pyrrolidinyl)ethyl adamantane-1,3-dicarboxylate, bis-2-morpholinoethyl adamantane-1,3-dicarboxylate, and bis-2-(4-methyl - 1 - piperazinyl)ethyl adamantane-1,3-dicarboxylate.

EXAMPLE 6

The procedure of Example 1 is repeated using 6.0 grams of adamantane-1,3-diacetic acid, 100 ml. of anhydrous 2-propanol, and 7.5 grams of 3-diethylaminopropyl chloride. The product, obtained as a yellow liquid boiling at about 260–270° C. at 1.5 mm. pressure, is bis-3-diethylaminopropyl adamantane-1,3-diacetate.

To a solution of 0.8 gram of anhydrous citric acid in 10 ml. of absolute ethanol there is added 1.0 gram of the amine obtained above. The mixture is stirred and heated to reflux on a steam bath and allowed to cool. Then, 30 ml. of anhydrous ethyl ether is added to the solution and a white tacky solid precipitates. This material solidifies when 2 drops of water are added to the mixture with stirring. The solid is separated by filtration, washed with anhydrous ethyl ether, and dried in a steam cabinet to give bis-3-diethylaminopropyl adamantane-1,3-diacetate dicitrate hemihydrate melting at about 83–87 C.

EXAMPLE 7

A mixture of 6.0 grams of adamantane-1,3-dicarboxylic acid and 30 ml. of thionyl chloride is refluxed on a steam bath for 5 hours. Unreacted thionyl chloride is removed by distilling the mixture on a steam bath under reduced pressure. Azeotropically dried benzene is added to the residue and distillation is resumed to remove final traces of thionyl chloride. Then, the residual adamantane-1,3-carbonyl chloride is dissolved in 30 ml. of azeotropically dried benzene and added, in a steady stream with stirring, to a solution of 7.8 grams of 6-dimethylaminohexanol in 30 ml. of azeotropically dried benzene. This mixture is stirred and refluxed for 2 hours. It is then allowed to stand for 16 hours before the benzene is removed by vacuum distillation on a steam bath. The residue is dissolved in 200 ml. of distilled water and extracted twice with anhydrous ethyl ether. The aqueous layer is then filtered through diatomaceous earth and potassium carbonate is added to the aqueous filtrate until no more oil is released. The oil is extracted with anhydrous ethyl ether and the ether extract is dried over anhydrous sodium sulfate and treated with charcoal. Distillation of the solution first removes the ether and then gives bis-6-dimethylaminohexyl adamantane-1,3-dicarboxylate boiling at about 230–240° C. at 0.2 mm. pressure.

To a solution of 1.5 grams of anhydrous citric acid in 30 ml. of absolute ethanol there is added 1.9 grams of the ester obtained above, with stirring. The mixture is first heated to reflux and then allowed to cool. A lower liquid layer separates and this solidifies with the addition of three drops of water and vigorous stirring and cooling. The white solid is comminuted and filtered before it is again comminuted under ethyl ether, filtered and dried to give bis-6-dimethylaminohexyl adamantane-1,3-dicarboxylate dicitrate hemihydrate melting at about 98–103 C. The free base of this compound has the following formula

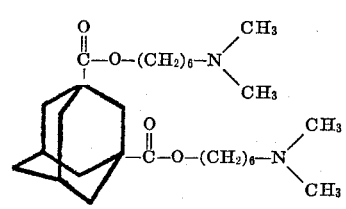

EXAMPLE 8

Adamantane-1,3-dicarbonyl chloride is prepared from 6.0 grams of adamantane-1,3-dicarboxylic acid and 30 ml. of thionyl chloride according to the procedure described in Example 7. The acid chloride obtained is dissolved in 40 ml. of azeotropically dried benzene and added, in a steady stream with stirring, to a solution of 8.5 grams of 4-methyl-1-piperazinepropanol in 40 ml. of azeotropically dried benzene. The resulting mixture is refluxed on a steam bath for 2 hours and allowed to cool to room temperature. It is then dissolved in 200 ml. of water, saturated with potassium carbonate, and diluted with 100 ml. of benzene. The benzene layer, including a dark oily lower phase, is separated and dried over anhydrous sodium sulfate and filtered. The benzene solvent is removed under reduced pressure and the residue is distilled to give bis-3-(4-methyl-1-piperazinyl)propyl adamantane-1,3-dicarboxylate as a pale yellow viscous syrup boiling at about 246–250° C. at 0.05 mm. pressure.

EXAMPLE 9

Adamantane-1,3-diacetyl chloride is prepared from 7.0 grams of adamantane-1,3-diacetic acid and 40 ml. of thionyl chloride according to the procedure for the preparation of the acid chloride described in Example 7. The acid chloride obtained here is dissolved in 40 ml. of azeotropically dried benzene and added in a rapid stream to a solution of 10 grams of 6-diethylaminohexanol in 40 ml. of azeotropically dried benzene. The mixture is refluxed for 4 hours and the benzene is removed by distillation on a steam bath under reduced pressure. The resulting residue is dissolved in 200 ml. of water and the aqueous solution is extracted twice with anhydrous ethyl ether and then made alkaline with potassium carbonate. The resulting mixture is extracted with anhydrous ether and the ether extract is dried over anhydrous sodium sulfate and treated with charcoal. The solvent is evaporated from the ether solution and the residue is further distilled to give bis-6-diethylaminohexyl adamantane-1,3-diacetate boiling at about 260–280° C. at 0.5 mm. pressure.

EXAMPLE 10

7.6 grams of adamantane-1,3-diacetic acid is converted to the acid chloride and reacted with 9.5 grams of 4-methyl-1-piperazinepropanol according to the procedure described in Example 8. The reaction mixture is refluxed for 4 hours and then allowed to stand for 16 hours during which time a semi-solid layer separates. The benzene is decanted and the remaining material is dissolved in water and treated with potassium carbonate. The resultant oily material is agitated vigorously with ethyl acetate and the ethyl acetate layer and a lower viscous organic layer are separated from the mixture, combined, and dried over anhydrous sodium sulfate. The dried extract is concentrated under reduced pressure and the residue is distilled to give bis-3-(4-methyl-1-piperazinyl)propyl adamantane-1,3-diacetate boiling at about 255–265° C. at 0.1 mm. pressure.

To a solution of 1.0 gram of the above amino ester and 80 ml. of acetone there is added, with stirring, 2.0 ml. of an anhydrous hydrogen chloride 2-propanol solution containing 0.26 gram of hydrogen chloride per ml. A gelatinous precipitate forms and is separated by filtration and washed by suspension in 50 ml. of acetone. The solid is then dried under a stream of nitrogen to give bis-3-(4-methyl-1-piperazinyl)propyl adamantane-1,3-diacetate tetrahydrochloride hydrate melting at 248–253° C. The free base of this compound has the following formula

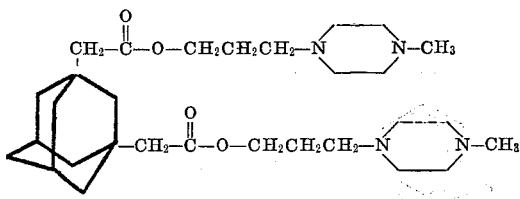

EXAMPLE 11

Adamantane-1,3-dicarbonyl chloride is prepared from 7.8 grams of an adamantane-1,3-dicarboxylic acid according to the procedure described in Example 7. The resulting acid chloride is dissolved in 75 ml. of dry pyridine and to this solution there is added, in one batch with stirring at room temperature, a suspension of 13.6 grams of 2-dimethylaminoethanethiol hydrochloride in 75 ml. of dry pyridine. The mixture is stirred and heated on a steam bath for 1 hour and then refluxed for 2 hours. It is filtered hot and then allowed to cool to room temperature. The resultant mixture is filtered and the filtrate is allowed to stand for 16 hours. The gel which forms is separated by filtration using a rubber dam, washed twice with acetone, and dried in a steam cabinet. A solution is prepared from 1.0 gram of this material and 20 ml. of distilled water and a solution of 1.0 gram of sodium hydroxide in 10 ml. of distilled water is added. An emulsion forms and is extracted with 60 ml. of anhydrous ethyl ether and the ether extract is washed with three 20 ml. portions of distilled water. The ether solution is dried over anhydrous sodium sulfate and the ether is evaporated under a stream of dry nitrogen. The residue is dissolved in 20 ml. of anhydrous 2-propanol and filtered to remove a small amount of solid. The filtrate is then mixed with 1.0 ml. of a 2-propanol solution containing 0.26 gram hydrogen chloride per ml. Anhydrous ethyl ether is added and the precipitate which forms is separated by filtration using a rubber dam and the solid is dried in a steam cabinet to give S-(2-dimethylaminoethyl) adamantane-1,3-dithiocarboxylate melting at about 234–254° C. with decomposition. The free base of this compound has the following formula

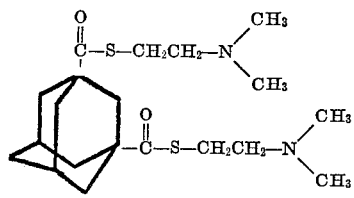

What is claimed is:
1. A member selected from the group consisting of compounds of the formula

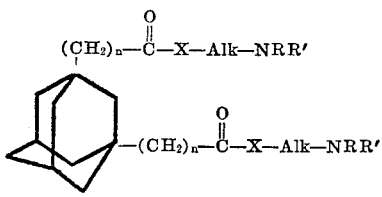

wherein $n$ is 0 or 1; X is selected from the group consisting of O and S; Alk is lower alkylene having up to 6 carbon atoms and separating the atoms attached thereto by at least two carbon atoms; and —NRR' is selected from the group consisting of di(lower alkyl)amino with said lower alkyl groups having up to 6 carbon atoms, 1-pyrrolidinyl, piperidino, and 4-methyl-1-piperazinyl; and the pharmaceutically acceptable acid addition and lower alkyl halide quaternary ammonium salts thereof, said lower alkyl group having up to 6 carbon atoms and said quaternary salts involving all of the amino groups present in the molecule.

2. A compound according to claim 1 which has the formula

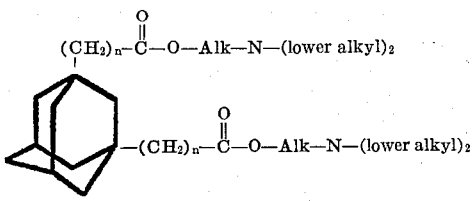

wherein $n$ is 0 or 1; the lower alkyl groups have up to 6 carbon atoms; and Alk is lower alkylene having up to 6 carbon atoms and separating the atoms attached thereto by at least 2 carbon atoms.

3. A compound according to the claim 1 which is bis-2-diethylaminoethyl adamantane-1,3-dicarboxylate.

4. A compound according to claim 1 which is bis-3-diethylaminopropyl adamantane-1,3-dicarboxylate.

5. A compound according to claim 1 which is bis-3-diethylaminopropyl adamantane - 1,3 - dicarboxylate bis-ethobromide.

6. A compound according to claim 1 which is bis-6-dimethylaminohexyl adamantane-1,3-dicarboxylate.

7. A compound according to claim 1 which is bis-6-diethylaminohexyl adamantane-1,3-diacetate.

8. A compound according to claim 1 which is bis-3-(4-methyl-1-piperazinyl)propyl adamantane-1,3-diaceate.

References Cited
UNITED STATES PATENTS

| | | | |
|---|---|---|---|
| 3,547,976 | 12/1970 | Krimmel | 260—326.3 |
| 3,657,273 | 4/1972 | Krimmel | 260—268 |
| 3,565,942 | 2/1971 | Krimmel | 260—468 B |
| 3,573,312 | 3/1971 | Krimmel | 260—268 PL |
| 3,374,244 | 3/1968 | Krimmel | 260—268 PL |

DONALD G. DAUS, Primary Examiner

U.S. Cl. X.R.

260—247.1, 247.2, 268 R, 293.56, 326.3, 468 G; 424—248, 250, 267, 274, 305